June 7, 1949.  R. V. KEMPLIN  2,472,300
SELF-FASTENING CORD HOLDER
Filed Jan. 5, 1946
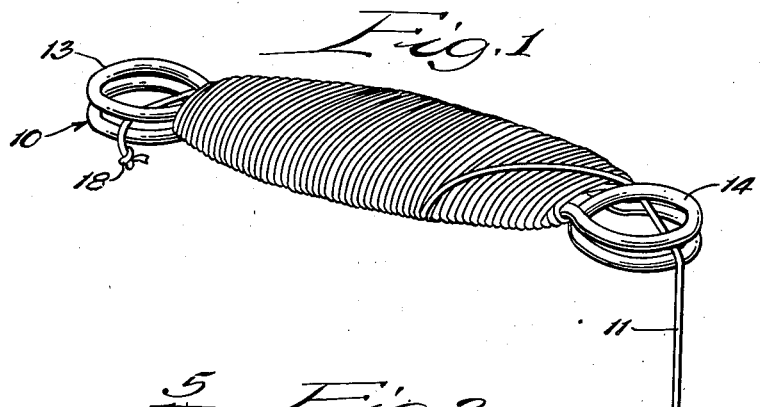
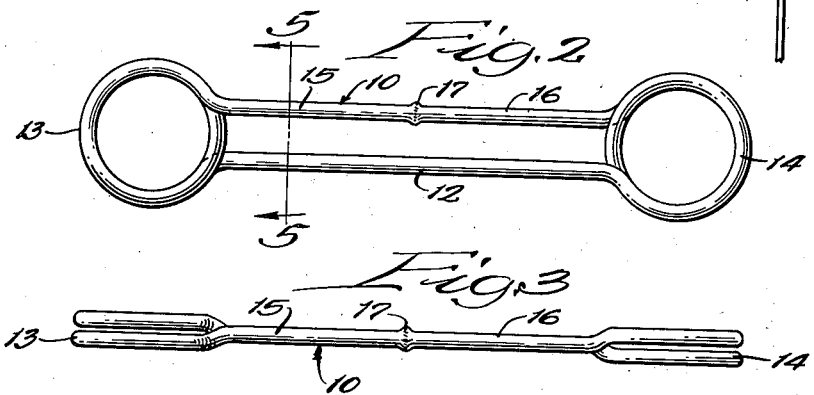
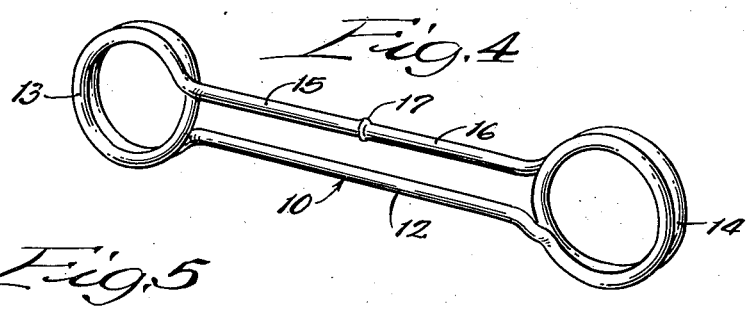
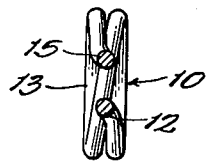
Inventor:
Ray V. Kemplin,
By Dawson, Corthay Spangenberg,
Attorneys.

Patented June 7, 1949

2,472,300

UNITED STATES PATENT OFFICE 2,472,300

SELF-FASTENING CORD HOLDER

Ray V. Kemplin, Chicago, Ill.

Application January 5, 1946, Serial No. 639,239

1 Claim. (Cl. 242—96)

This invention relates to cord holders and more particularly to such holders formed of wire.

The principal object of this invention is to provide an improved cord holder having a body portion upon which the cord may be wound, formed of spaced parallel portions of the wire and terminal portions formed of convolutions of the wire in which the cord may be fastened.

The spaced parallel portions of the wire forming the body portion provide a relatively large surface upon which the cord may be wound so that a relatively long length of cord may be wound thereon with relatively few turns of the cord. In other words, winding and unwinding of the cord on the body portion is facilitated and accelerated by the spaced wire construction.

The convolutions of the wire forming the terminal portions of the holder provide means for readily fastening the cord to prevent unwinding of the same. Either terminal portion may be used for this purpose.

By reason of the spaced parallel portions of the wire joining the convolutions of the wire the ends of the wire may be made to abut each other whereby the ends of the wire forming the holder do not protrude at any point. Preferably the ends of the wire abut each other in the body portion of the holder where they may be concealed by the cord wound thereon. Also, the ends of the wire may be butt welded to increase the strength and rigidity of the holder.

The holder may be utilized for winding and fastening any type of cord for any purpose, as for example strings utilized for plumb bobs, chalk lines and level lines and ropes used for hanging clothes to dry. The term "cord" is used generically in this respect. Of course, the cord holder must be of varying sizes depending upon the use to which it is to be put, and such varying sizes and uses are contemplated in this invention. For example, a holder for clothes lines would be considerably larger and made of heavier material than would one for plumb bob lines.

Other objects and advantages will become apparent to those skilled in the art upon reference to the accompanying specification, claim, and drawing, in which—

Fig. 1 is a perspective view of the holder with the cord wound thereon;

Fig. 2 is a plan view of the holder;

Fig. 3 is a side elevational view of the holder;

Fig. 4 is a perspective view of the holder; and

Fig. 5 is a sectional view taken substantially along the line 5—5 of Fig. 2.

The holder is generally designated as 10 and is adapted to have a cord 11 wound thereon, as shown in Fig. 1.

The holder 10 is preferably made of a single piece of wire formed as shown in Figs. 2 to 4. It includes a straight portion 12 of wire merging into convolutions 13 and 14. As shown, the convolutions 13 and 14 each comprise substantially two turns of wire. The ends of the wire 15 and 16 merging with and extending from the convolutions 13 and 14 abut each other at 17 and for purposes of rigidity and strength they may be butt welded as at 17.

The ends 15 and 16 of the wire abutting each other at 17 are parallel with the straight portion 12 of the wire and are spaced therefrom to form a body portion for the holder. Because of the parallel spaced relationship of the wires in the body portion, a relatively large surface is presented upon which the cord may be wound and as a result a relatively long length of cord may be wound thereon with relatively few turns of the cord. Winding and unwinding of the cord on the body portion is thereby facilitated and accelerated.

The convolutions 13 and 14 of the holder form terminal portions to prevent the cord 11 from slipping off the body portion and also to provide means for readily fastening the cord to prevent unwinding of the same. In this latter respect the cord 11 when unwound to a desired extent may be inserted between the turns of the convolution 13 or 14 respectively. Fig. 1 shows the cord inserted in the convolution 14 for fastening the same.

In beginning the winding of the cord 11 on the holder 10, the cord may be tied to the straight portion 12 or the straight portions 15, 16 of the wire of the holder, or the cord may be provided with a knot, as indicated at 18 in Fig. 1 and inserted in one of the convolutions 13 or 14. In Fig. 1 the beginning of the cord is shown as being inserted in the convolution 13. Either manner of fastening the cord to the holder may be utilized and affords a means for anchoring the cord to the holder preparatory to winding the cord thereon.

By reason of the construction shown herein the ends of the wire forming the holder abut each other in the body portion whereby the ends of the wire forming the holder do not protrude at any point and may be concealed by the cord wound thereon.

While for purposes of illustration one form of this invention has been disclosed, other forms thereof may become apparent to those skilled in the art and, therefore, this invention is to be lim-

I claim as my invention:

A cord holder formed of a single wire and having a pair of spaced convolutions at each end connected by a straight portion of the wire on one side of the centerline of the two convolutions and parallel thereto and straight end portions of the wire extending from the pairs of convolutions into abutting relation on the other side of the centerline of the two convolutions and in spaced parallel relation thereto, the straight spaced parallel portions forming a body portion upon which the cord may be readily wound and the two pairs of convolutions each providing a fastening means for the cord passing through the space between the same.

RAY V. KEMPLIN.

REFERENCES CITED

The following references are of record in the file of this patent:

UNITED STATES PATENTS

| Number | Name | Date |
| --- | --- | --- |
| 1,178,056 | Craig | Apr. 4, 1916 |
| 1,710,384 | Sommer | Apr. 23, 1929 |